United States Patent [19]

Hamidieh et al.

[11] Patent Number: 5,407,265

[45] Date of Patent: Apr. 18, 1995

[54] SYSTEM AND METHOD FOR DETECTING CUTTING TOOL FAILURE

[75] Inventors: Youssef A. Hamidieh, Bloomfield Hills; Brij B. Seth, Canton, both of Mich.

[73] Assignee: Ford Motor Company, Dearborn, Mich.

[21] Appl. No.: 909,336

[22] Filed: Jul. 6, 1992

[51] Int. Cl.⁶ ............................................. G08B 21/00
[52] U.S. Cl. ................................... 340/680; 73/104; 73/660; 340/683; 364/474.17
[58] Field of Search ............... 340/680, 683, 669, 511, 340/522; 73/104, 660, 488; 364/474.16–474.20, 507–508, 551.02

[56] References Cited

U.S. PATENT DOCUMENTS

| | | | |
|---|---|---|---|
| 4,559,600 | 12/1985 | Rao | 364/474.17 X |
| 4,636,779 | 1/1987 | Thomas et al. | 340/680 |
| 4,642,617 | 2/1987 | Thomas et al. | 340/680 |
| 4,744,242 | 5/1988 | Anderson et al. | 73/104 |
| 4,849,741 | 7/1989 | Thomas | 340/683 |
| 4,918,427 | 4/1990 | Thomas et al. | 340/680 |
| 5,115,671 | 5/1992 | Hicho | 73/488 |

FOREIGN PATENT DOCUMENTS 27633 3/1981 Japan ............................ 340/683

OTHER PUBLICATIONS

Braun et al., "Signature Analysis Applied to Drilling", ASME, 1981, pp. 1–9.
Rotberg et al., "Vibration-Based Drill Wear Monitoring", ASME, 1990, pp. 60–65.
"An On-Line Method of Determining Tool Wear by Time-Domain Analysis", by K. W. Yee, et al, SME, 1982, pp. 1–6.
"In-Process Detection of Tool Breakage by Monitoring the Spindle Motor Current of a Machine Tool", ASME, 1982, pp. 145–153.
"On the Use of Drill-Up for On-Line Determination of Drill Wear", by K. W. Yee, SME, 1984, Paper No. MS84-914.
"Computer-Assisted Prediction of Drill-Failure Using In-Process Measurements of Thrust Force", A. Thangaraj, et al, ASME, 1986, pp. 303–322.
"Linear Discriminant Function Analysis of Acoustic Emission Signals for Cutting Tool Monitoring", E. Kannatey-Asibu, et al, Mechanical Systems and Signal Processing, 1987.
"Tool Break Detection by Monitoring Ultrasonic Vibrations", S. R. Hayashi, et al, G. E. Corporate Research & Development, Jan. 18, 1988.
"Milling Cutter Breakage CIRP Sensing", Annals of the CIRP, vol. 37/1/88, Jan. 19, 1988, pp. 45–51.
"In-Process Detection of Tool Failure in Milling Using Cutting Force Models", Y. Altintas, et al, Journal of Engineering for Industry, May 1989, vol. 111, pp. 149–157.
"On-Line Monitoring of Tool and Cutting Conditions in Milling", J. H. Tarn, et al, Transactions of the ASME, vol. 111, Aug. 1989, pp. 206–212.

*Primary Examiner*—John K. Peng
*Assistant Examiner*—Thomas J. Mullen, Jr.
*Attorney, Agent, or Firm*—Roger L. May; Joseph W. Malleck

[57] ABSTRACT

Failure detection in an operating cutting tool utilizing a frequency domain analysis of the vibration of the cutting tool. A signal is generated based on vibration of the tool during its operation to determine the energy of the signal in a plurality of signal component frequency bands. The energy of the signal in each of the plurality of frequency bands is compared to corresponding threshold values to generate a tool failure signal when the energy of the signal in a preselected number of frequency bands exceeds the corresponding threshold values for a predetermined period of time. In a second embodiment, time domain analysis of the signal generated based on vibration of the tool is utilized in addition to frequency domain analysis. The averaged signal is compared to a threshold signal to generate a tool failure signal when both the energy of the signal in a preselected number of frequency bands exceeds the corresponding threshold values and the averaged signal exceeds the threshold signal.

28 Claims, 6 Drawing Sheets

SYSTEM AND METHOD FOR DETECTING CUTTING TOOL FAILURE

TECHNICAL FIELD

This invention relates generally to a system and method for detecting failure of a cutting tool and, specifically, to a system and method for detecting failure of a cutting tool based on frequency domain monitoring of the vibration of the cutting tool.

BACKGROUND ART

Maximization of productivity is an increasingly important goal in industrial operations. This goal can be accomplished in part by various forms of quality control. Quality control is affected by numerous factors, including wear and tear of machine tool components which can lead to poor quality product. The efficiency of cutting tools in particular, such as those in milling or drilling operations, can be substantially increased through the use of systems and methods for detecting the failure of the cutting tool. Such systems and methods recognize failure of the cutting tool and allow for its replacement to prevent production of product that falls below minimum quality standards. In addition to quality improvement, such systems and methods improve efficiency by decreasing machine tool down-time and reducing overall tooling costs.

Various systems and methods exist for analysis of rotating machines in general. Two papers authored by S.G. Braun and B.B. Seth entitled "On The Extraction And Filtering Of Signals Acquired From Rotating Machines" published in the *JOURNAL OF SOUND AND VIBRATION* in 1979, and "Signature Analysis Methods And Applications For Rotating Machines", published in *AMERICAN SOCIETY OF MECHANICAL ENGINEERS* in 1977, disclose diagnostic analysis of internal combustion engines. The periodic nature of the signal acquired from a rotating machine, such as an internal combustion engine, can be correlated to given states of the machine. Signals are analyzed through both time and frequency domain signal processing techniques including filtering, digitizing and Fourier transformations.

Similar signal analysis based approaches have been employed for investigating the wear or lifespan of drills in industrial drilling operations. Once again, both time and frequency domain analysis of the vibration signal generated by the drilling process, including techniques such as filtering, digitizing and Fourier transformation, can be employed to analyze the state of the drill. In "Vibration-Based Drill Wear Monitoring", authored by J. Rotberg, E. Lenz and S. Braun, published in *AMERICAN SOCIETY OF MECHANICAL ENGINEERS* in 1990, a finite element model is disclosed that correlates the probability and intensity of high frequency signal transients to the development of tool wear. Similar approaches are disclosed in "An On-Line Method of Determining Tool Wear By Time Domain Analysis" authored by K. Yee and D. Blomquist, published in *SOCIETY OF MANUFACTURING ENGINEERS* in 1982, and "Signature Analysis Applied To Drilling" authored by S. Braun, E. Lenz and C.L. Wu, published in *AMERICAN SOCIETY OF MECHANICAL ENGINEERS* in 1981.

On-line wear monitoring of other cutting tools, such as those of milling operations, has been accomplished in like fashion. "Mechanical Signature Analysis In Interrupted Cutting", authored by J. Rotberg, E. Lenz and S. Braun, published in *ANNALS OF THE CIRP* in 1987, discloses time domain analysis of vibration signals generated during the cutting process. Signal variation during interrupted cutting, as the cutting tool engages and disengages a workpiece, can be correlated to cutting tool wear.

Various on-line systems and methods are also known for detecting failure of machine tools by analyzing signals in the time domain. One such system is disclosed in "In-Process Detection Of Tool Breakage By Monitoring The Spindle Motor Current Of A Machine Tool", authored by K. Matsushima, P. Bertok and T. Sata, published in *AMERICAN SOCIETY OF MECHANICAL ENGINEERS* in 1982. Tool breakage events can be detected by examination of wave form variations in the current through the motor driving the spindle that houses the cutting tool.

Other systems and methods for detecting failure of machine tools analyze various forces present during the machining process. "Computer Assisted Prediction Of Drill Failure Using In-Process Measurements Of Thrust Forces", authored by A. Thangaraj and P.K. Wright, published in *AMERICAN SOCIETY OF MECHANICAL ENGINEERS* in 1988, discloses the use of dynamometers to measure the thrust force of a drill on a workpiece. Time domain analysis of the resultant signal can be used to correlate thrust forces to tool failure.

Similarly, the cutting force on a workpiece by a cutting tool can also be measured by dynamometers and, through time domain analysis techniques, correlated to tool failure. Tool failure detection systems of this type are disclosed in "In-Process Detection of Tool Failure in Milling Using Cutting Forces Models", authored by Y. Altintas and I. Yellowley, published in the *JOURNAL OF ENGINEERING FOR INDUSTRY* in 1989, "On-Line Monitoring Of Tool And Cutting Conditions In Milling", authored by J.H. Tarn and M. Tomizuka, published in the *JOURNAL OF ENGINEERING FOR INDUSTRY* in 1989, and "Milling Cutter Breakage Sensing", authored by J. Tlusty published in *ANNALS OF CIRP*, in 1988.

Additionally, as in the area of tool wear detection, time domain analysis of vibration signals generated during the cutting process has been used to detect failure of the cutting tool. "Tool Break Detection By Monitoring Ultrasonic Vibrations", authored by S. Hayashi, C. Thomas, and D. Wildes, published in *ANNALS OF THE CIRP* in 1988, and "On The Use Of Drill-Up For On-Line Determination Of Drill Wear", authored by K. Yee, published in *SOCIETY OF MANUFACTURING ENGINEERS* in 1984, disclose on-line systems and methods for determining drill wear and breakage by applying time domain analysis to vibration or acoustic signals generated during the drilling process.

Similarly, U.S. Pat. Nos. 4,636,779 and 4,849,741, both issued to Thomas, and U.S. Pat. No. 4,642,617, issued to Thomas et al, all disclose on-line systems and methods for detecting tool breakage by applying various time domain analysis techniques to vibration signals generated during the machining process. The signal processing includes analysis techniques such as amplification, filtering and digitizing. The systems and methods can trigger tool breakage alarms based on constant values pre-set during a normal machining operation.

Each of the above methods and systems for detecting tool failure, however, suffer from a variety of problems.

Since only a small number of lower quality discriminants, or criteria, are examined to determine whether the machine tool has failed, false tool failure alarms are not uncommon. Moreover, various anomalies can affect the vibration signal and its analysis in the time domain. Such anomalies can, once again, result in false triggering of tool failure alarms.

Frequency domain analysis of vibration signals generated during the cutting process has also been used to investigate failure of the cutting tool. "Linear Discriminant Function Analysis Of Acoustic Emission Signals For Cutting Tool Monitoring", authored by E. Kannatey-Asibu and E. Emel, published in *MECHANICAL SYSTEMS AND SIGNAL PROCESSING* in 1987, and "Statistical Process Control Of Acoustic Emission For Cutting Tool Monitoring", authored by A. Houshmand and E. Kannatey-Asibu, published in *MECHANICAL SYSTEMS AND SIGNAL PROCESSING* in 1989, disclose such methods. The use of frequency domain analysis lessens the effect of anomalies in the vibration signal generated during the machining process, thereby reducing the possibility of inaccurate decisions.

These methods, however, also suffer from various problems. First, only a limited number of discriminants are used in determining tool failure. As with time domain analysis tool failure detection methods, this can lead to the indication of false tool failures. Second, only pre-set threshold values for these discriminants are used. Such values are determined by machine cycles where breakage is intentionally induced. As result, the method is ill-suited for production plant applications since presetting through intentionally induced breakage is unfeasible. Finally, the method does not provide for on-line indications of tool failure.

SUMMARY OF THE INVENTION

According to the present invention, an on-line system and method for detecting failure of a cutting tool are provided. The system comprises means for accomplishing the method steps of generating a signal based on vibration of the tool during its operation and determining the energy of the signal in a plurality of signal component frequency bands. The system also comprises means for accomplishing the further method steps of comparing the energy of the signal in each of the plurality of frequency bands to corresponding threshold values and generating a tool failure signal when the energy of the signal in a preselected number of frequency bands exceeds the corresponding threshold values for a predetermined period of time.

Accordingly, it is a principle object of this invention to provide an on-line system and method for detecting failure of a cutting tool during its operation utilizing frequency domain analysis of vibration signals generated during machining operations to reduce false indications of tool failure.

Another principle object of this invention is to provide an on-line system and method for detecting failure of a cutting tool during its operation utilizing multiple, high-quality discriminant based decision making based on signal energies in preselected frequency bands to reduce false indications of tool failure.

Another object of this invention is to provide an on-line system and method for detecting failure of a cutting tool during its operation utilizing time and frequency domain analysis of vibration signals generated during machining operations to reduce false indications of tool failure.

Still another object of this invention is to provide an on-line system and method for detecting failure of a cutting tool during its operation utilizing multiple, high-quality discriminant based decision making based on average signal characteristics and signal energies in preselected frequency bands to reduce false indications of tool failure.

Yet another object of this invention is to provide an on-line system and method for detecting failure of a cutting tool during its operation having a self-teaching capability for discriminant setting to eliminate pre-setting of discriminants through tuning operations.

These and other objects and advantages will be readily apparent upon consideration of the following detailed description and drawings.

DETAILED DESCRIPTION OF THE INVENTION

Figure 1:
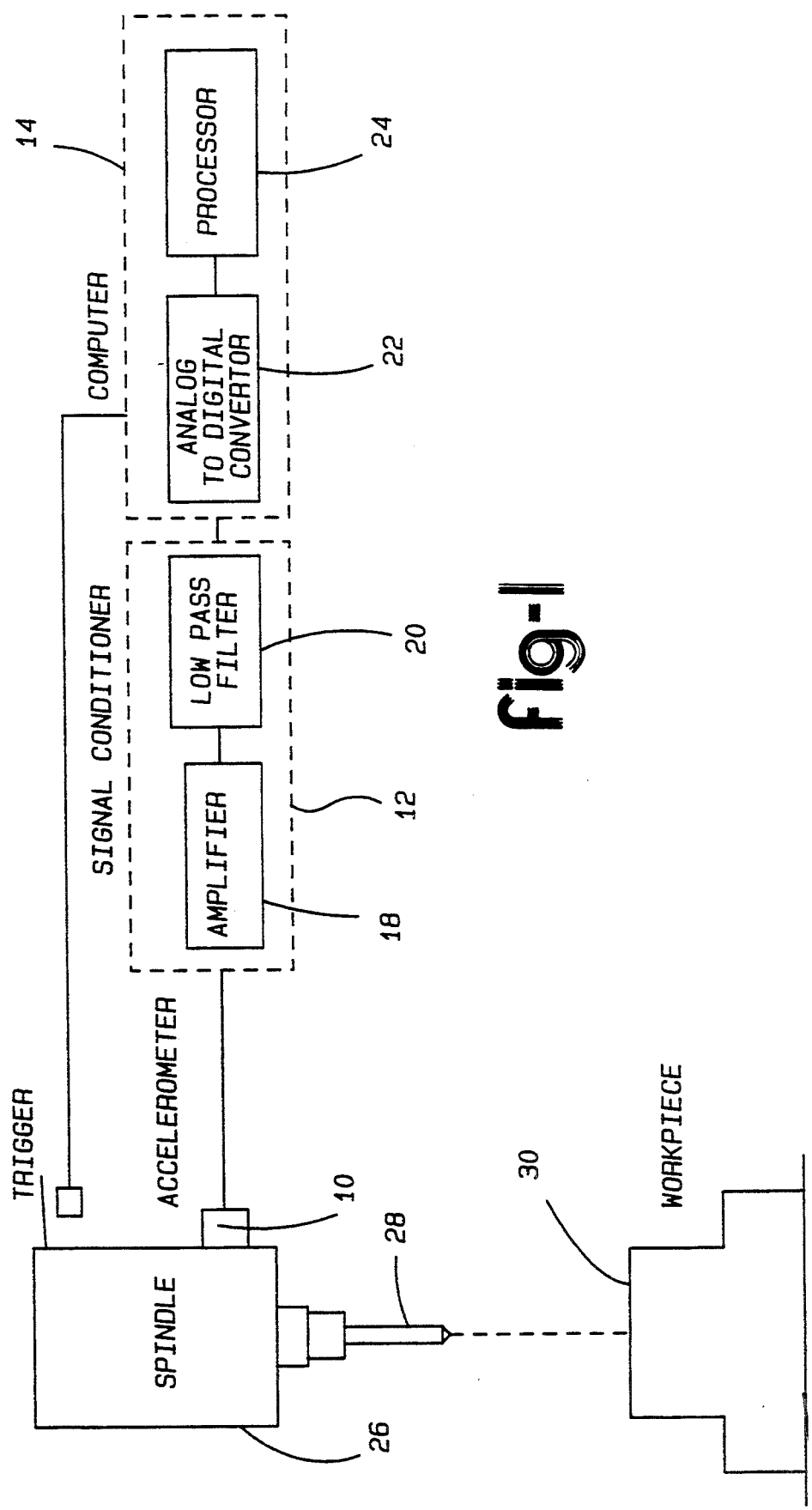
FIG. 1 is block diagram of the system for detecting failure of a cutting tool of the present invention.

Referring to FIG. 1, the system for detecting failure of a cutting tool of the present invention is shown in block diagram form. The system comprises an accelerometer (10) or other similar sensor in electrical communication with a signal conditioner (12) and a computer (14). The signal conditioner (12) includes an amplifier (18) and a low band pass filter (20). The computer (14) includes an analogue to digital convertor (22) and a processor (24) for signal processing operations.

The accelerometer (10) is of ordinary design and is mounted to the spindle (26) of the cutting tool (28). As will be discussed in more detail below, depending on the specific embodiment of the present invention, the accelerometer (10) may also be mounted at the workpiece (30). Moreover, as depicted in FIG. 1, the tool (28) is a drill. However, the tool (28) may be any type of cutting tool, such as those commonly employed in milling operations.

During operation, the tool (28) performs a cutting function on the workpiece (30). This cutting function produces continuous vibrations in the tool (28), workpiece (30) and spindle (26). The accelerometer (10) provides a means for generating a signal based upon the vibration of the tool (28) during operation. The accelerometer measures the vibration of the tool (28) and generates a voltage signal in response as a function of time.

The amplifier (18) provides a means for amplifying the signal generated by the accelerometer (10). The amplified signal from the accelerometer (10) is then filtered by the low band pass filter (20). The filter (20) provides a means for filtering the signal to attenuate high frequency components of the signal from the accelerometer (10). The amplified and filtered signal from the accelerometer (10) is finally fed to convertor (22). Convertor (22) provides a means for converting the signal from analogue to digital form.

Processor (24) then performs a variety of signal processing operations on the digitized signal from the convertor (22) necessary for accurate tool failure detection. Such operations include fast Fourier transform (FFT) computations. To timely execute such FFT computations, processor (24) is provided with Digital Signal Processing (DSP) capabilities. As with the accelerometer (10), the amplifier (18), filter (20), convertor (22) and processor (24) are of ordinary design well known in the art.

Figure 2:
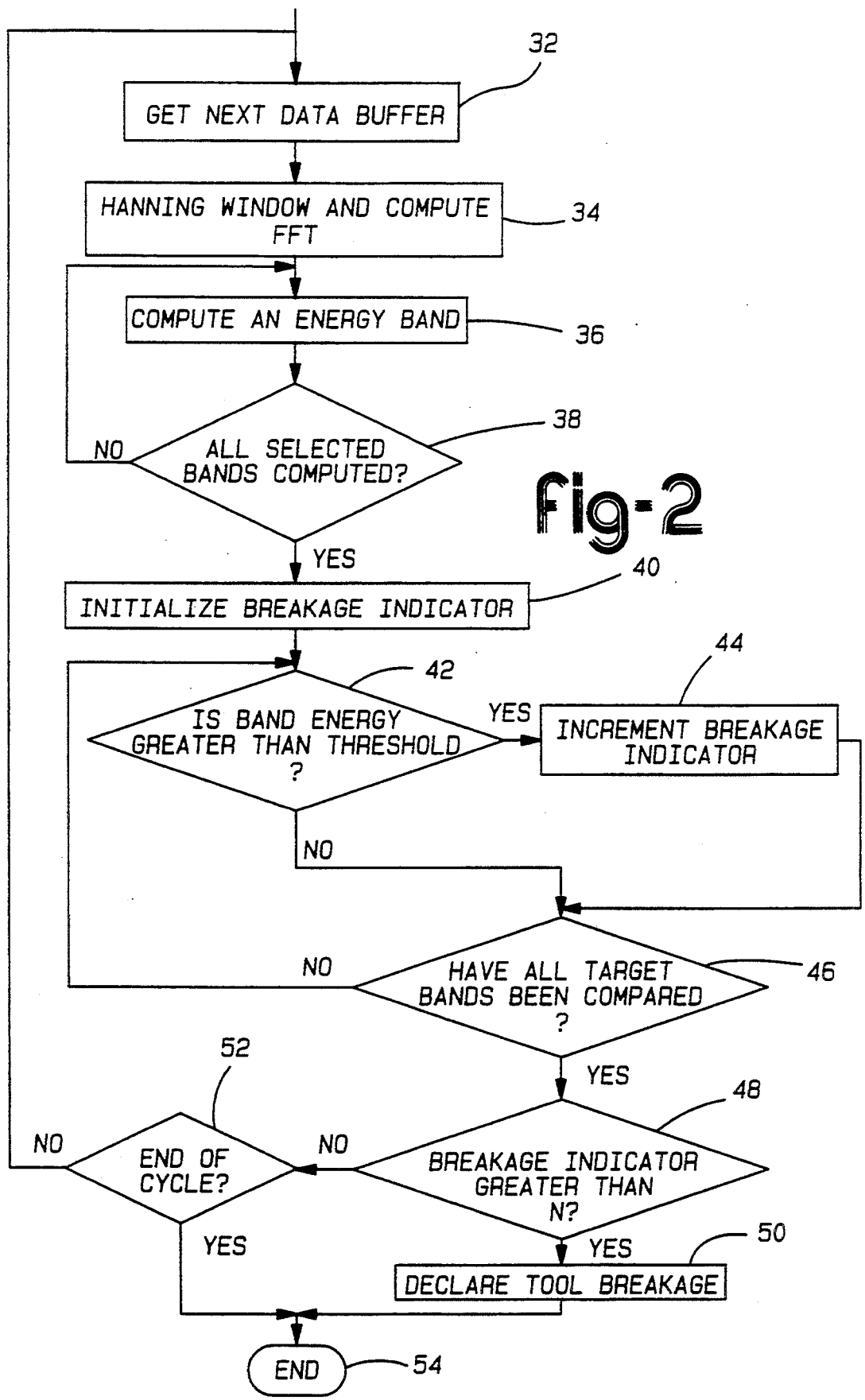
FIG. 2 is the decision making algorithm for the system and method for detecting failure of a cutting tool of the present invention utilizing frequency domain analysis.

Referring now to FIG. 2, the decision making algorithm for the system and method for detecting failure of a cutting tool of the present invention utilizing frequency domain analysis is shown. As depicted therein, sampling at a rapid rate of 25 kHz or other high rate, a buffer of data points is first gathered (32) from the accelerometer (10). The number of data points can be 1024 or another suitable even number.

Next, a Hanning or other suitable window function is performed (34) on the amplified, filtered and digitized signal from the accelerometer (10). Such a window function is performed to prevent possible data leakage. In addition to the window function, a fast Fourier transform (FFT) is computed (34) to convert the signal from the time domain to the frequency domain.

Thereafter, the energy of the signal in various component frequency bands is determined (36,38) by the processor (24). This is accomplished first by calculating the energy of the signal at specific frequencies by squaring the signal amplitude at each specific frequency. Next, the individual signal energies at each specific frequency are summed over predefined frequency bands. Such frequency bands may be defined in any suitable manner, for example 1–100 Hz, 101–200 Hz, and so forth.

A breakage indicator is then initialized (40) to zero. The signal energies in preselected frequency bands are then compared (42) to corresponding predetermined threshold signal energy values for those frequency bands. The setting of such threshold signal energy values is discussed in detail below. Whenever a signal energy in a preselected frequency band exceeds the corresponding threshold signal energy value, the breakage indicator is incremented (44).

After each signal energy for the preselected frequency bands is checked against its corresponding threshold signal energy value (46), the final value of the breakage indicator is checked (48). If the breakage indicator value exceeds some predefined number, then a tool failure signal is generated (50). The tool failure signal can result in either the sounding of an alarm, or the automatic shutdown of the machine tool.

If, however, the value of the breakage indicator does not exceed the predefined number, the process is repeated with another buffer of data points (32) until either a tool failure signal is generated (50) or an end of cycle signal is received (52). The generation of a tool failure signal (50) or an end of cycle signal (52) results in the end (54) of the algorithm.

In the present embodiment, the tool failure signal is generated (50) when the tool breakage indicator exceeds a predefined number (48) in any single buffer of data points. However, the system can also be designed to generate a tool failure signal only after the tool breakage indicator exceeds a predefined number over a plurality of data buffers.

It should also be noted that frequency domain analysis utilizing signal energy values as discriminants has an inherent advantage that reduces the possibility of generating an inaccurate tool failure signal, or false triggering. Such frequency domain analysis reduces the effect of anomalies in the vibration signal generated during the machining process. Signal anomalies are reduced because, in such frequency domain analysis, there is a very large magnification of energy bands at the time of tool failure. By comparison, variations in the vibration signal from the cutting tool (28) sensed by the accelerometer (10) due to ordinary contact of the cutting tool (28) and the workpiece (30) cause relatively minor magnification of energy bands.

Thus, in frequency domain based analysis utilizing signal energy values as discriminants, threshold signal energy values can be set high enough such that ordinary contact between the cutting tool (28) and the workpiece (30) does not generate a tool failure signal. There is no parallel to this fact with tool failure detection systems and methods based solely on time domain discriminants. As a result, such frequency domain based discriminants are of higher quality for tool failure detection than time domain based discriminants.

In the embodiment discussed above, the amplifier (18), filter (20), convertor (22), and software of the processor (24) necessary to perform the signal energy calculations described above together provide a means for determining the energy of the signal in a plurality of signal component frequency bands. Such software includes that necessary to perform a suitable window function on the data and transform the data from the time domain to the frequency domain.

Additional software of the processor (24) necessary to perform the signal energy comparisons and tool breakage indicator incrementation functions described above provides a means for comparing the energy of the signal in each of the plurality of frequency bands to corresponding predetermined threshold values. Finally, software of the processor (24) necessary for the tool breakage indicator comparison and signal generation functions described above provides a means for generating a tool failure signal when the energy of the signal in a preselected number of frequency bands exceeds the corresponding threshold values for a single data buffer.

Figure 3:
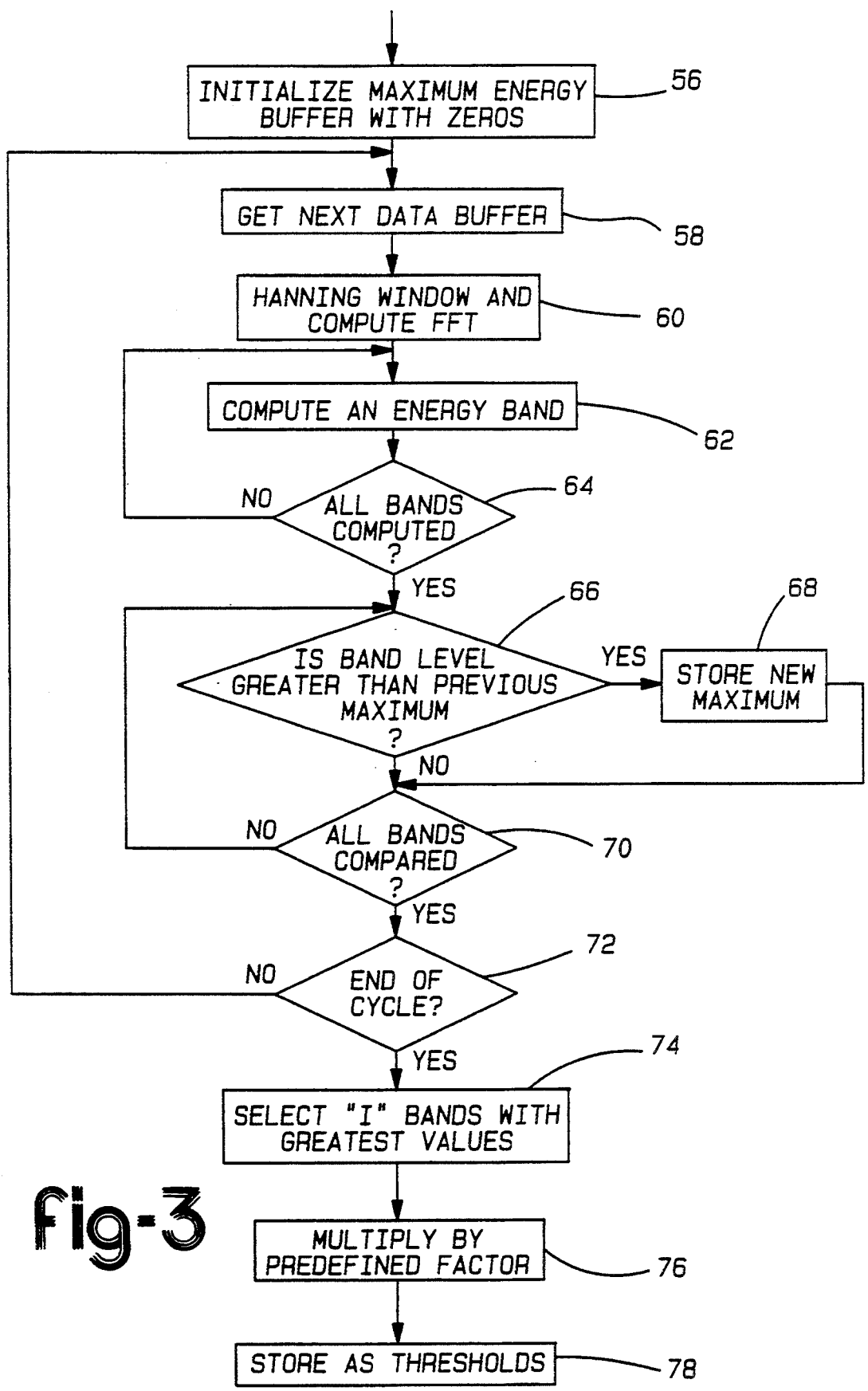
FIG. 3 is the threshold setting algorithm for the system and method for detecting failure of a cutting tool of the present invention utilizing frequency domain analysis.

Referring now to FIG. 3, the threshold setting algorithm for the system and method for detecting failure of a cutting tool of the present invention utilizing frequency domain analysis is shown. As depicted therein, a buffer of data points wherein the maximum signal energies for the preselected frequency bands will be stored is initialized (56) to zero. With the same sampling rate as that of the monitoring operation described above, a buffer of data points is gathered (58) during a failure-free or "tuning" cycle of the cutting tool (28). Next, a Hanning or other suitable window function is performed (60) on the amplified, filtered and digitized signal from the accelerometer (10). In addition to the window function, a fast Fourier transform (FFT) is computed (60) to convert the signal from the time domain to the frequency domain.

Thereafter, the energy of the signal in various component frequency bands is determined (62,64) by the processor (24). This is accomplished first by calculating the energy of the signal at specific frequencies by squaring the signal amplitude at each specific frequency. Next, the individual signal energies at each specific frequency are summed over predefined frequency bands. As is readily apparent, up to this point the decision making and threshold setting algorithms for the present invention shown in FIGS. 2 and 3 are similar.

However, at this point the algorithms diverge. The newly calculated signal energy values in all of the frequency bands are compared (66) to those previously stored in the maximum signal energy buffer (56). The highest signal energy value for each of the frequency bands is then stored (68) as the updated preliminary signal energy values.

The process is once again repeated (70) until an end of cycle signal is received (72). In such a manner, the maximum signal energy values for each frequency band over an entire failure-free machining cycle are determined.

At the end of the cycle, a predetermined number of frequency bands having the highest signal energy values are selected and noted (74). The updated preliminary signal energy values previously stored for these selected frequency bands are multiplied by a predetermined factor (76) and the result stored (78) as the threshold signal energy values which will be used for comparison purposes for tool failure detection during an ordinary machining cycle of the cutting tool (28). It should be noted that in alternative embodiments, the frequency bands chosen for comparison purposes may be selected by criteria other than maximum signal energy values, such as a variance criteria or simple preselection.

In the above description of the algorithm for setting threshold signal energy values, software of the processor (24) necessary to perform the signal energy calculations, signal energy comparisons and storage functions described above provides a means for determining threshold values for each frequency band over a normal machining cycle. Such software includes that necessary to perform a suitable window function on the data and transform the data from the time domain to the frequency domain.

In either of the algorithms shown in FIGS. 2 and 3, the individual data buffers gathered from accelerometer (10) are not affected by the mounting of the accelerometer (10) on either the spindle (26) or the workpiece (30). This is due to the fact that any vibration caused by the cutting function of the tool (28) during the machining operation is common to both the spindle (26) and the workpiece (30). As a result, the accelerometer (10) may be mounted either to the spindle (26) or at the workpiece (30) during the operation of either of these algorithms.

Figure 4:
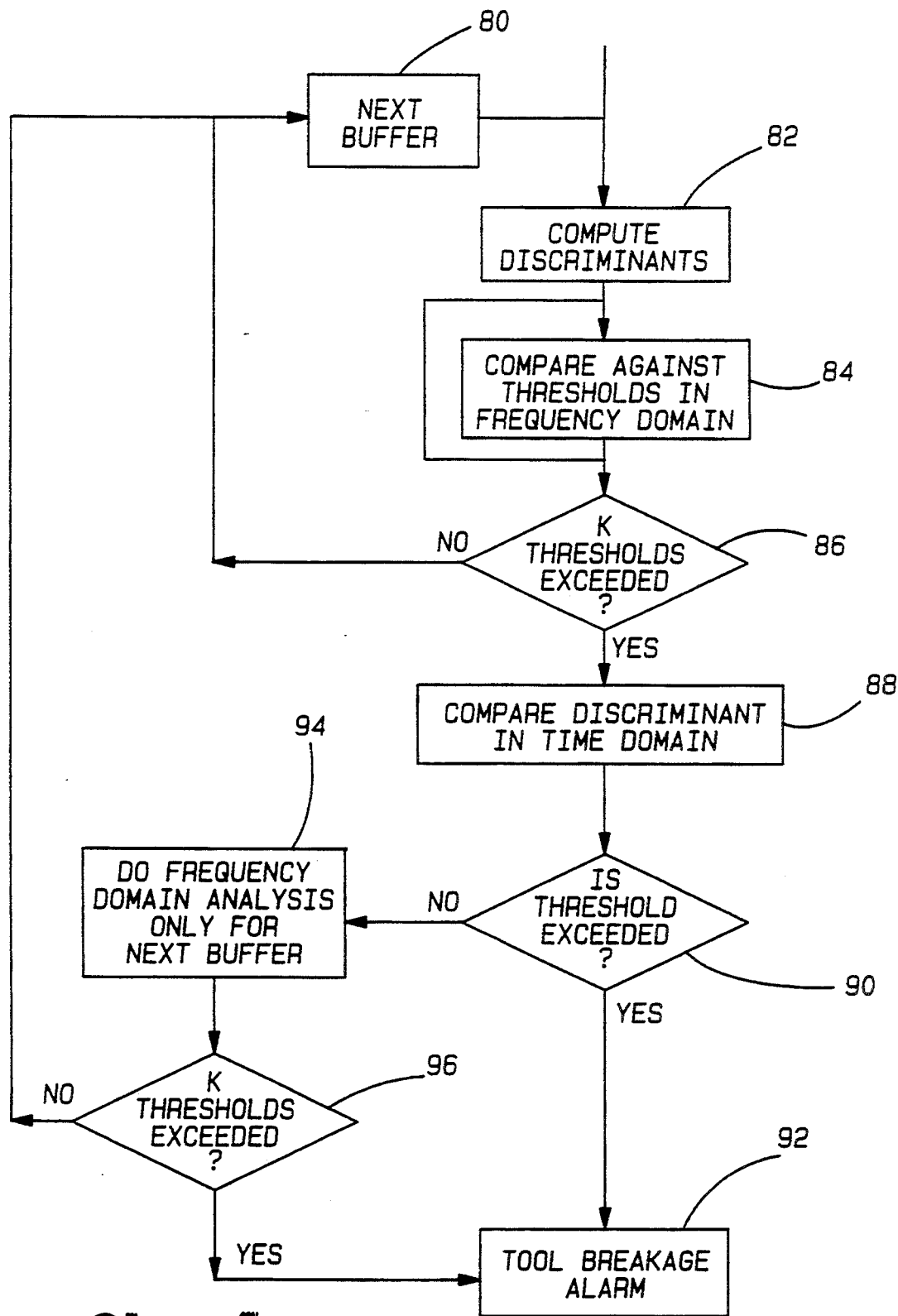
FIG. 4 is the decision making algorithm for an alternative embodiment of the system and method for detecting failure of a cutting tool of the present invention utilizing frequency and time domain analysis.

Referring now to FIG. 4, the decision making algorithm for an alternative embodiment of the system and method for detecting failure of a cutting tool of the present invention is shown. This alternative embodiment of the system and method of the present invention eliminates the need for setting threshold signal energy values during a failure-free or "tuning" cycle of the cutting tool (28). For increased accuracy in tool failure detection, the alternative embodiment also adds time domain analysis of the vibration signal from the accelerometer (10) to the existing frequency domain analysis.

The decision making algorithm for the alternative embodiment of the system and method of the present invention is initially identical to the decision making algorithm of the original embodiment. Once again, sampling at a rapid rate of 25 kHz or other high rate, a buffer of data points is first gathered (80) by the accelerometer (10). Next, a Hanning or other suitable window function is performed on the amplified, filtered and digitized signal from the accelerometer (10). In addition to the window function, a fast Fourier transform (FFT) is computed to convert the signal from the time domain to the frequency domain.

Thereafter, the energy of the signal in various component frequency bands is determined by the processor (24). This is accomplished first by calculating the energy of the signal at specific frequencies by squaring the signal amplitude at each specific frequency. Next, the individual signal energies at each specific frequency are summed over predefined frequency bands.

However, at this point the decision making algorithms of the two embodiments begin to diverge. Added to the algorithm are time domain analysis techniques. First, multiple discriminants for use in detecting cutting tool failure are computed (82). In this process, a moving average signal is computed through the use of a constant and predetermined period or "window" of time. The data points falling within such a window are used to calculate an average signal. The window is then shifted such that the first data point within the window is dropped and an additional data point is acquired at the end of the window. A new average signal is then calculated based upon the new set of data points. The process is then repeated as desired. In such a manner, a "moving" average signal is calculated. Next, the peak amplitude of each moving average signal is determined.

Thereafter, the alternative embodiment of the system and method of the present invention selects a number of frequency and time domain discriminants and sets corresponding threshold values for use in detecting tool failure. First, a predetermined number of frequency bands having the highest signal energy values are selected and noted. Next, the threshold signal energy value is set. This is accomplished by calculating the average signal energy value for each preselected frequency band over a plurality of FFT computations. Each average signal energy value is then divided into the difference between the maximum and average signal values for that frequency band. The quotient is multiplied by a predefined factor and the result is stored as the threshold signal energy value for that frequency band.

In the time domain monitoring aspect of this embodiment, the threshold signal is set in a similar manner. An average is computed for the peak amplitudes of the moving average signals determined earlier. The average peak amplitude is then divided into the difference between the maximum and the average peak amplitudes. The quotient is multiplied by a predefined factor and the result is stored as the threshold signal. The formula for calculating the threshold discriminants is depicted mathematically below.

$$\text{Threshold } D_j = \left[ \frac{Y_{j(max)} - Y_{j(ave)}}{Y_{j(ave)}} \right] K$$

where: $D_j$ is a discriminant, $j = 1, 2, 3, \ldots M$;
$Y_{j(max)}$ is the maximum value of $D_j$;
$Y_{j(ave)}$ is the average value of $D_j$; and
K is the predefined factor.

Alternatively, the threshold discriminant may also be set based on average values only.

The alternative embodiment of the system and method of the present invention eliminates the need for setting threshold signal energy values during a failure-free or "tuning" cycle of the cutting tool (28). This embodiment also eliminates the possibility of false triggering due to vibration level variations caused by sources other than the operation of the cutting tool, such as bearing failure. The tuning cycle is eliminated by setting the threshold discriminants described above as the spindle (26) and cutting tool (28) descend toward the workpiece (30). The accelerometer (10) can generate a signal as the tool (28) descends toward the workpiece (30) only if the accelerometer (10) is mounted on the spindle (26). As a result, during the operation of the algorithm shown in FIG. 4, the accelerometer (10) must be mounted on the spindle (26) for the threshold discriminants to be properly set.

The threshold discriminants may be set in this manner because of the inherent advantage of frequency domain analysis. As previously described, in frequency domain analysis utilizing signal energy values as discriminants, there is a very large magnification of energy bands at the time of tool failure. By comparison, variations in the vibration signal from the cutting tool (28) sensed by the accelerometer (10) upon contact of the cutting tool (28) and the workpiece (30) cause relatively minor magnification of energy bands.

Thus, in frequency domain based analysis utilizing signal energy values as discriminants, threshold signal energy values can be set high enough such that contact between the cutting tool (28) and the workpiece (30) does not generate a tool failure signal. Because there is no parallel to this fact with tool failure detection systems and methods based solely on time domain analysis, frequency domain based discriminants are of higher quality for tool failure detection than time domain based discriminants. Moreover, the use of multiple discriminants in the form of both signal energy in preselected frequency bands and an averaged signal in the time domain also reduces the possibility of generating an inaccurate tool failure signal.

Subsequently, a breakage indicator is initialized to zero. The signal energies in the preselected frequency bands are then compared (84) to the corresponding threshold signal energy values for those frequency bands as determined above. Whenever a signal energy in a preselected frequency band exceeds the corresponding threshold signal energy value, the breakage indicator is incremented.

After each signal energy for the preselected frequency bands is checked against its corresponding threshold signal energy value, the final value of the breakage indicator is checked. If the breakage indicator value exceeds some predefined number (86), the average peak signal amplitude from the time domain is compared (88) to the threshold signal value as determined above. If the average peak signal amplitude in the time domain also exceeds the threshold signal value (90), then a tool failure signal is generated (92).

If, however, the value of the breakage indicator exceeds the predefined number (86), but the average signal amplitude in the time domain does not exceed the threshold signal value (90), the frequency domain analysis involving signal energies is repeated with another buffer of data points (94). If the breakage indicator still exceeds the predefined number (96), then a tool failure signal is generated (92) regardless of the state of the signal in the time domain.

Moreover, if the breakage indicator does not exceed the predefined number, then a tool failure signal will not be generated regardless of the state of the signal in the time domain. Analysis will continue until either a tool failure signal is generated or an end of cycle signal is received. As previously noted, the tool failure signal can result in either the sounding of an alarm, or the automatic shutdown of the machine tool.

In the above description of the decision making algorithm for the alternative embodiment of the system and method of the present invention, the amplifier (18), filter (20), convertor (22), and software of the processor (24) necessary to perform the time domain signal sampling and calculations described above together provide a means for determining a moving average signal and a threshold signal in the time domain.

Additional software of the processor (24) necessary to perform the signal energy calculations, signal energy comparisons and storage functions described above provides a means for determining the threshold values corresponding to the energy of the signal in the plurality of frequency bands. Such software includes that necessary to perform a suitable window function on the data and transform the data from the time domain to the frequency domain.

Still further software of the processor (24) necessary to perform the average signal and signal energy comparisons, as well as the tool breakage indicator incrementation functions described above provides a means for comparing the time domain moving average signal and the energy of the signal in each of the plurality of frequency bands to the time domain threshold signal and frequency domain threshold energy values respectively. Finally, software of the processor (24) necessary for the tool breakage indicator comparison and signal generation functions described above provides a means for generating a supplemental tool failure signal when the time domain average signal and the energy of the signal in the preselected number of frequency bands exceed the time domain threshold signal and the corresponding frequency domain threshold energy values respectively at any time.

Figure 5:
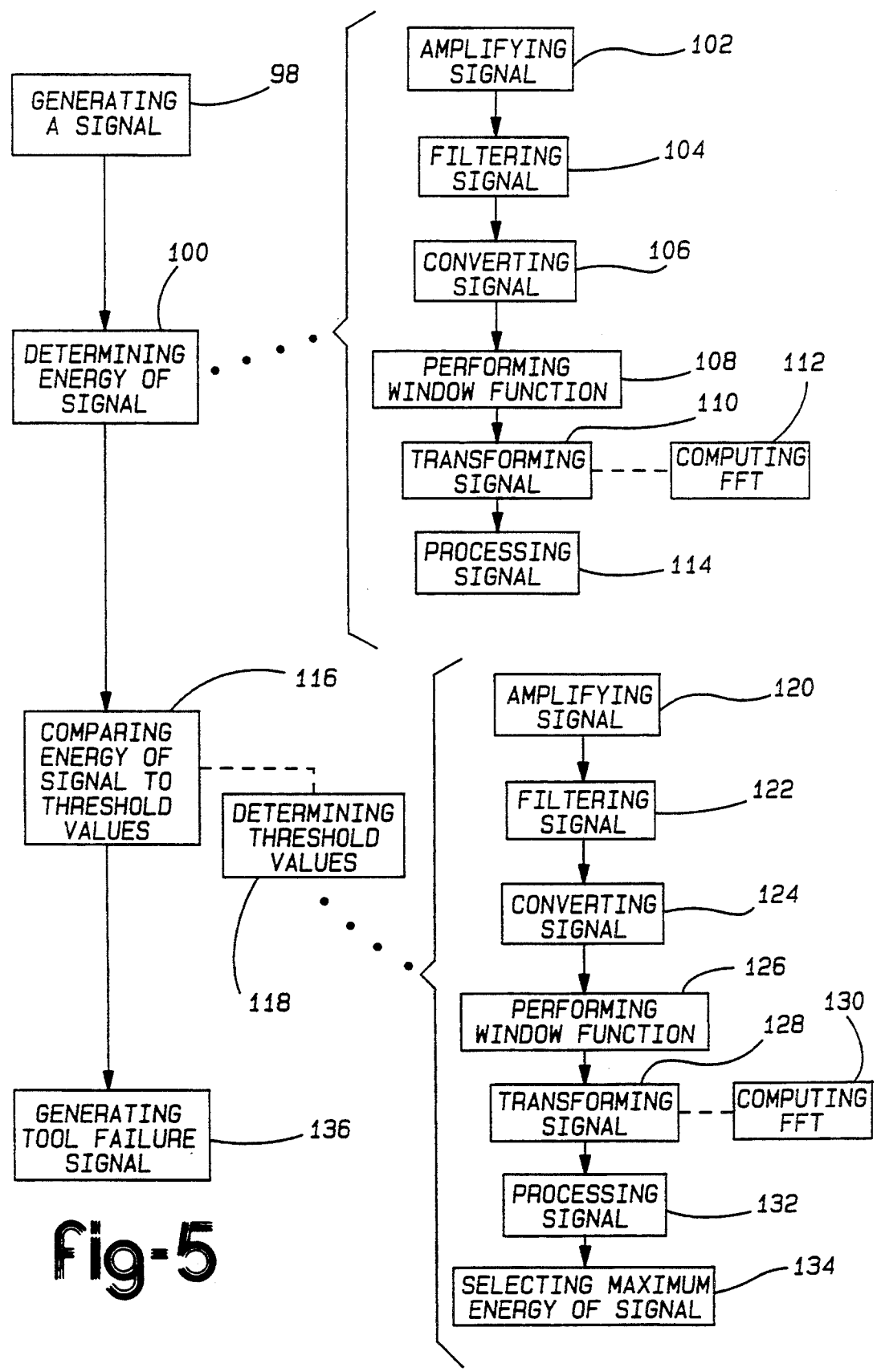
FIG. 5 is a block diagram of the method for detecting failure of a cutting tool of the present invention utilizing frequency domain analysis.

Referring now to FIG. 5, the method for detecting failure of a cutting tool of the present invention is shown in block diagram form. As depicted therein, the method begins with the step of generating (98) a signal based on vibration of the tool during its operation.

The next step in the method is determining (100) the energy of the signal in a plurality of signal component frequency bands, which includes the further method steps of amplifying (102) the signal, filtering (104) the signal, converting (106) the signal from analogue to digital form, performing (108) a window function on the signal, transforming (110) the signal from the time domain to the frequency domain to obtain a frequency domain signal, and processing (114) the frequency domain signal to obtain the sum of the squares of the amplitudes of component frequencies over selected frequency bands. The step of transforming (110) the signal from the time domain to the frequency domain includes the step of computing (112) the fast Fourier transform of the time domain signal. Each of these steps are performed in the particular manner as described above in the discussion of the system of the present invention.

The next step in the method of the present invention is comparing (116) the energy of the signal in each of the plurality of frequency bands to corresponding predetermined threshold values, which includes the further method step of determining (118) threshold values for each frequency band over an entire machining cycle.

The method step of determining threshold values includes the further method steps of amplifying (120) the signal, filter (122) the signal, converting (124) the signal from analogue to digital form, performing (126) a window function on the signal, transforming (128) the signal from the time domain to the frequency domain to obtain a frequency domain signal, processing (132) the frequency domain signal to obtain the sum of the squares of the amplitudes of component frequencies over selected frequency bands, and selecting (134) maximum energy of the signal over the selected frequency bands. The step of transforming (128) the signal from the time domain to the frequency domain includes the step of computing (130) the fast Fourier transform of the time domain signal.

Finally, the method of the present invention concludes with the step of generating (136) a tool failure signal when the energy of the signal in a preselected number of frequency bands exceeds the corresponding threshold values for a predetermined period of time. Once again, the particulars of these steps are as described in the previous discussion of the system of the present invention.

Figure 6:
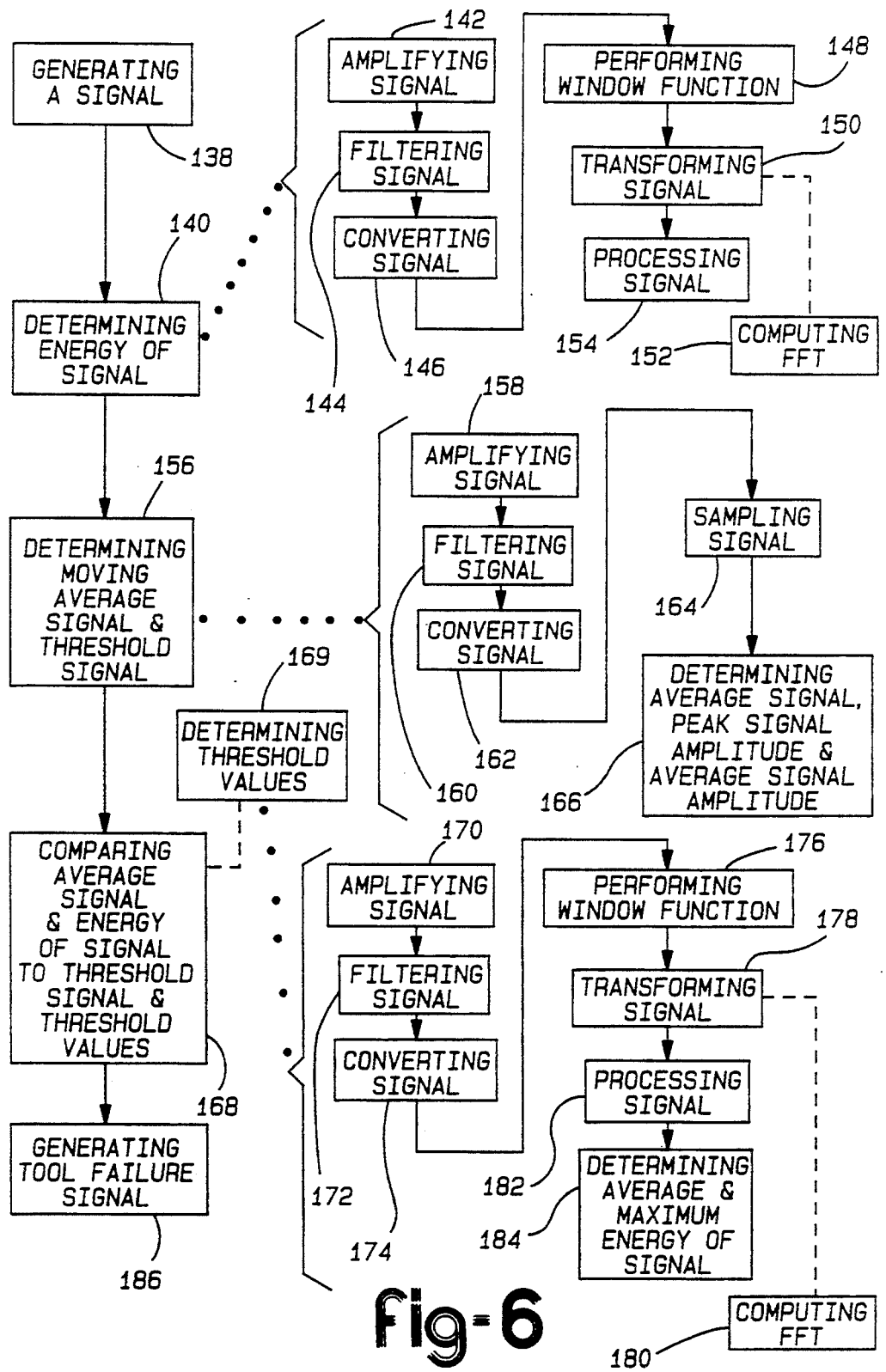
FIG. 6 is a block diagram of an alternative embodiment of the method for detecting failure of a cutting tool of the present invention utilizing frequency and time domain analysis.

Referring finally to FIG. 6, an alternative embodiment of the method of the present invention is shown. As depicted therein, the alternative embodiment includes additional method steps to that of the original embodiment (138-154). The first additional step is determining (156) a moving average signal and a threshold signal in the time domain, which itself includes the further method steps of amplifying (158) the signal, filtering (160) the signal, converting (162) the signal from analogue to digital form, sampling (164) the signal in a plurality of time periods, each period having an equal duration and advancing an equal increment of time relative to the preceding period, and determining (166) an average signal, a peak signal amplitude and an average signal amplitude over the plurality of time periods. As stated earlier, the particulars of these steps are as described previously in the discussion of the system of the present invention.

The next additional method step in the alternative embodiment of the method of the present invention is comparing (168) the average signal and the energy of the signal to the threshold signal and threshold values, respectively. This step includes the further step of determining (169) the threshold values corresponding to the energy of the signal in the plurality of frequency bands.

The step of determining (169) the threshold values also includes the additional method steps of amplifying (170) the signal, filtering (172) the signal, converting (174) the signal from analogue to digital form, performing (176) a window function on the signal, transforming (178) the signal from the time domain to the frequency domain, processing (182) the frequency domain signal to obtain the sum of the squares of the amplitudes of component frequencies over selected frequency bands, and determining (184) an average and maximum energy of the signal in each of the plurality of frequency bands. The step of transforming (178) the signal from the time domain to the frequency domain includes the step of computing (180) the fast Fourier transform of the time domain signal. Here again, the particulars of these steps are as described above in the discussion of the system of the present invention.

The final method step of the alternative embodiment of the method of the present invention is generating (186) a supplemental tool failure signal when the average signal and the energy of the signal in the preselected number of frequency bands exceed the threshold signal and the corresponding threshold values respectively at any time. Again, the particulars of this step is described in the previous discussion of the system of the present invention.

It is to be understood that the invention herein has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

We claim:

1. A system for detecting failure of a cutting tool having a cutting cycle during its operation, the system comprising:

means for generating a time domain signal based on vibration of the tool during its operation;

means for transforming the time domain signal from the time domain to the frequency domain to obtain a frequency domain signal, the frequency domain signal having a plurality of component frequencies;

means for determining the energy of the frequency domain signal in each of a plurality of frequency bands by summing the squares of the amplitudes of the frequency domain signal at the plurality of component frequencies within each of the plurality of frequency bands;

means for comparing the energy of the frequency domain signal in each of the plurality of frequency bands to corresponding predetermined threshold values; and means for generating a tool failure signal when the energy of the frequency domain signal in at least two of the frequency bands exceeds the corresponding threshold values for a predetermined time period.

2. A system for detecting failure of a cutting tool having a cutting cycle during its operation, the system comprising:

means for generating a time domain signal based on vibration of the tool during its cutting cycle;

means for transforming the time domain signal from the time domain to the frequency domain to obtain a frequency domain signal, the frequency domain signal having a plurality of component frequencies;

means for determining the energy of the frequency domain signal in a plurality of frequency bands based on the of the frequency domain signal at the plurality of component frequencies;

means for comparing the energy of the frequency domain signal in each of the plurality of frequency bands to corresponding predetermined threshold values, wherein the means for comparing the energy of the frequency domain signal to predetermined threshold values includes means for determining a threshold value for each frequency band based on the cutting cycle; and means for generating a tool failure signal when the energy of the frequency domain signal in a preselected number of frequency bands exceeds the corresponding threshold values for a predetermined time period.

3. The system of claim 2 wherein the means for determining the energy of the frequency domain signal includes means for processing the frequency domain signal to obtain the sum of the squares of the amplitudes of the component frequencies over selected frequency bands.

4. The system of claim 2 wherein the means for determining threshold values includes:
means for amplifying the time domain signal;
means for filtering the time domain signal;
means for converting the time domain signal from analog to digital form; and
means for processing the time domain signal.

5. The system of claim 4 wherein the means for determining threshold values further includes means for processing the frequency domain signal to obtain the sum of the squares of the amplitudes of component frequencies over selected frequency bands.

6. The system of claim 5 wherein the means for determining threshold values further includes means for selecting a maximum energy value of the frequency domain signal for each selected frequency band over the cutting cycle.

7. The system of claim 2 further comprising:
means for determining a moving average time domain signal and a threshold signal in the time domain;
means for comparing the moving average time domain signal and the energy of the frequency domain signal in each of the plurality of frequency bands to the threshold signal and threshold values respectively; and
means for generating a supplemental tool failure signal when the moving average time domain signal and the energy of the frequency domain signal in the preselected number of frequency bands exceed the threshold signal and the corresponding threshold values respectively at any time.

8. The system of claim 7 wherein the means for determining the moving average time domain signal and the threshold signal includes:
means for amplifying the time domain signal;
means for filtering the time domain signal; and
means for converting the time domain signal from analog to digital form.

9. The system of claim 8 wherein the means for determining the moving average time domain signal and the threshold signal further includes means for sampling the time domain signal in a plurality of time periods, each period having an equal duration and advancing an equal increment of time relative to the preceding period.

10. The system of claim 9 wherein the means for determining the moving average time domain signal and the threshold signal further includes means for determining an average time domain signal, a peak time domain signal amplitude and an average time domain signal amplitude over the plurality of time periods.

11. The system of claim 7 wherein the means for determining the threshold values includes:
means for amplifying the time domain signal;
means for filtering the time domain signal;
means for converting the time domain signal from analog to digital form; and
means for processing the time domain signal.

12. The system of claim 11 wherein the means for determining threshold values further includes means for processing the frequency domain signal to obtain the sum of the squares of the amplitudes of component frequencies over selected frequency bands.

13. The system of claim 12 wherein the means for determining threshold values further includes means for determining an average energy of the frequency domain signal in each of the plurality of frequency bands and a maximum energy of the frequency domain signal in each of the plurality of frequency bands.

14. The system of claim 2 wherein the means for transforming the time domain signal includes means for computing the fast Fourier transform of the time domain signal.

15. A method for detecting failure of a cutting tool having a cutting cycle during its operation, the method comprising the steps of:
generating a time domain signal based on vibration of the tool during its operation;
transforming the time domain signal from the time domain to the frequency domain to obtain a frequency domain signal, the frequency domain signal having a plurality of component frequencies;
determining the energy of the frequency domain signal in each of a plurality of frequency bands by summing the squares of the amplitudes of the frequency domain signal at the plurality of component frequencies within each of the plurality of frequency bands;
comparing the energy of the frequency domain signal in each of the plurality of frequency bands to corresponding predetermined threshold values; and
generating a tool failure signal when the energy of the frequency domain signal in at least two of the frequency bands exceeds the corresponding threshold values for a predetermined time period.

16. A method for detecting failure of a cutting tool having a cutting cycle during its operation, the method comprising:
generating a time domain signal based on vibration of the tool during its cutting cycle;
transforming the time domain signal from the time domain to the frequency domain to obtain a frequency domain signal, the frequency domain signal having a plurality of component frequencies;
determining the energy of the frequency domain signal in a plurality of frequency bands based on the amplitudes of the frequency domain signal at the plurality of component frequencies;
comparing the energy of the frequency domain signal in each of the plurality of frequency bands to corresponding predetermined threshold values, wherein comparing the energy of the frequency domain signal to predetermined threshold values includes determining a threshold value for each frequency band based on the cutting cycle; and generating a tool failure signal when the energy of the frequency domain signal in a preselected number of frequency bands exceeds the corresponding threshold values for a predetermined time period.

17. The method of claim 16 wherein the step of determining the energy of the frequency domain signal includes processing the frequency domain signal to obtain the sum of the squares of the amplitudes of the component frequencies over selected frequency bands.

18. The method of claim 16 wherein the step of determining threshold values includes the steps of:
    amplifying the time domain signal;
    filtering the time domain signal;
    converting the time domain signal from analog to digital form; and processing the time domain signal.

19. The method of claim 18 wherein the step of determining threshold values further includes the step of processing the frequency domain signal to obtain the sum of the squares of the amplitudes of the component frequencies over selected frequency bands.

20. The method of claim 19 wherein the step of determining threshold values further includes the step of selecting a maximum energy value of the frequency domain signal for each selected frequency band over the cutting cycle.

21. The method of claim 16 further comprising the steps of:
    determining a moving average time domain signal and a threshold signal in the time domain;
    comparing the moving average time domain signal and the energy of the frequency domain signal in each of the plurality of frequency bands to the threshold signal and threshold values respectively; and
    generating a supplemental tool failure signal when the moving average time domain signal and the energy of the frequency domain signal in the preselected number of frequency bands exceed the threshold signal and the corresponding threshold values respectively at any time.

22. The method of claim 21 wherein the step of determining the moving average time domain signal and the threshold signal includes the steps of:
    amplifying the time domain signal;
    filtering the time domain signal; and
    converting the time domain signal from analog to digital form.

23. The method of claim 22 wherein the step of determining the moving average time domain signal and the threshold signal further includes the step of sampling the time domain signal in a plurality of time periods, each period having an equal duration and advancing an equal increment of time relative to the preceding period.

24. The method of claim 23 wherein the step of determining the moving average time domain signal and the threshold signal further includes the step of determining an average time domain signal, a peak time domain signal amplitude and an average time domain signal amplitude over the plurality of time periods.

25. The method of claim 21 wherein the step of determining threshold values includes the steps of:
    amplifying the time domain signal;
    filtering the time domain signal;
    converting the time domain signal from analog to digital form; and
    processing the time domain signal.

26. The method of claim 25 wherein the step of determining threshold values further includes the step of processing the frequency domain signal to obtain the sum of the squares of the amplitudes of the component frequencies over selected frequency bands.

27. The method of claim 26 wherein the step of determining threshold values further includes the step of determining an average energy of the frequency domain signal in each of the plurality of frequency bands and a maximum energy of the frequency domain signal in each of the plurality of frequency bands.

28. The method of claim 16 wherein the step of transforming the time domain signal includes the step of computing the fast Fourier transform of the time domain signal.

* * * * *